July 23, 1940. J. BARTHO ET AL 2,208,567
CUSHIONED WHEEL
Filed July 21, 1938 2 Sheets-Sheet 1
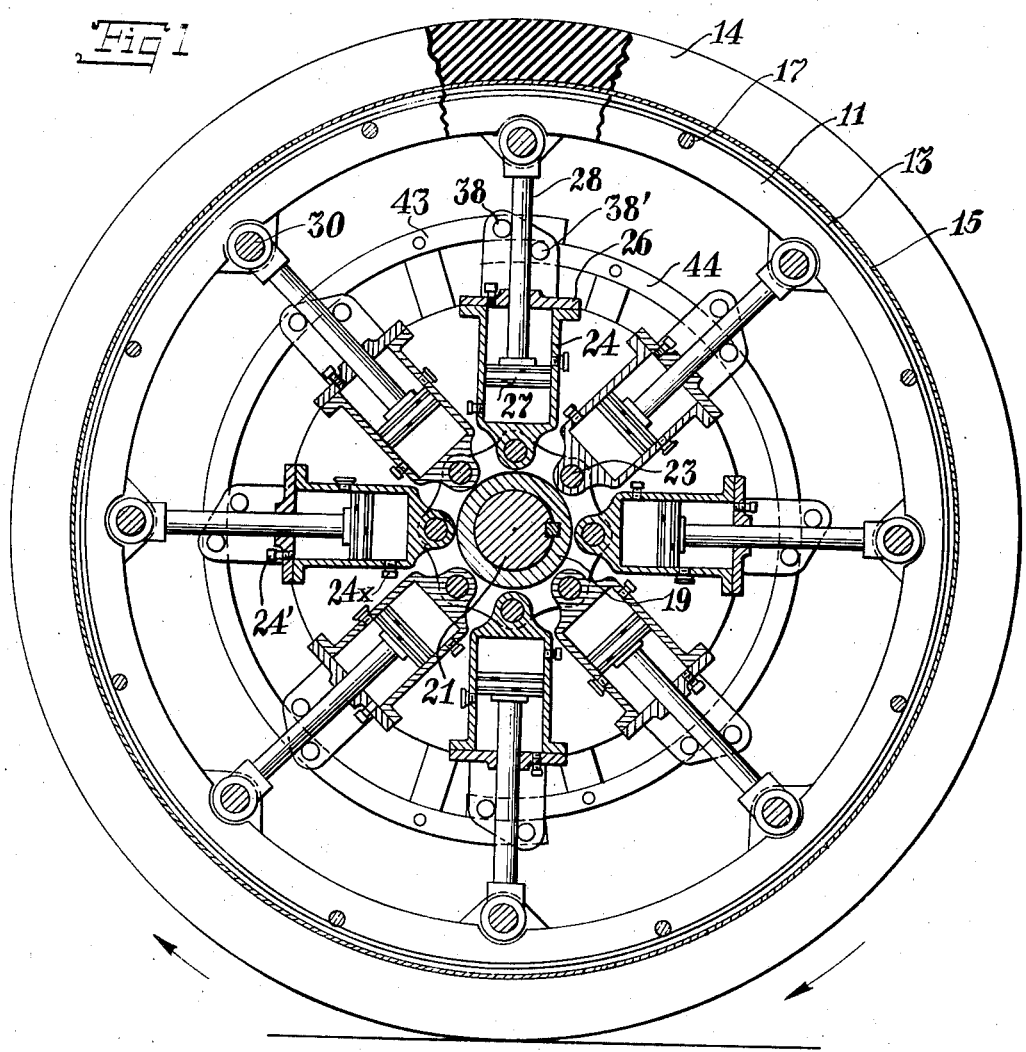
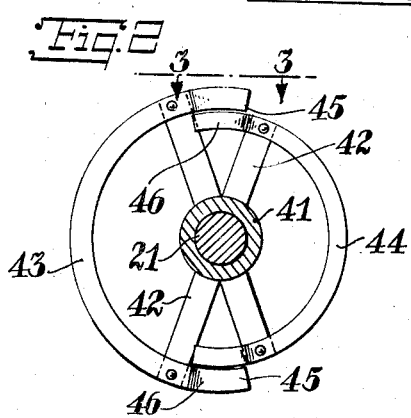
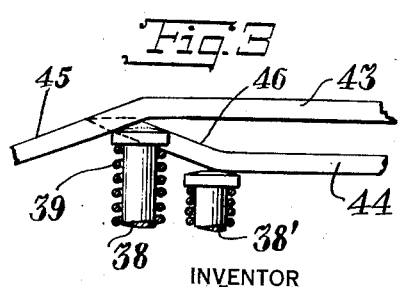
INVENTOR
JOHN BARTHO
JOHN T. ACKERSON
BY
Edw. S. Higgins
ATTORNEY July 23, 1940.    J. BARTHO ET AL    2,208,567
CUSHIONED WHEEL
Filed July 21, 1938    2 Sheets-Sheet 2
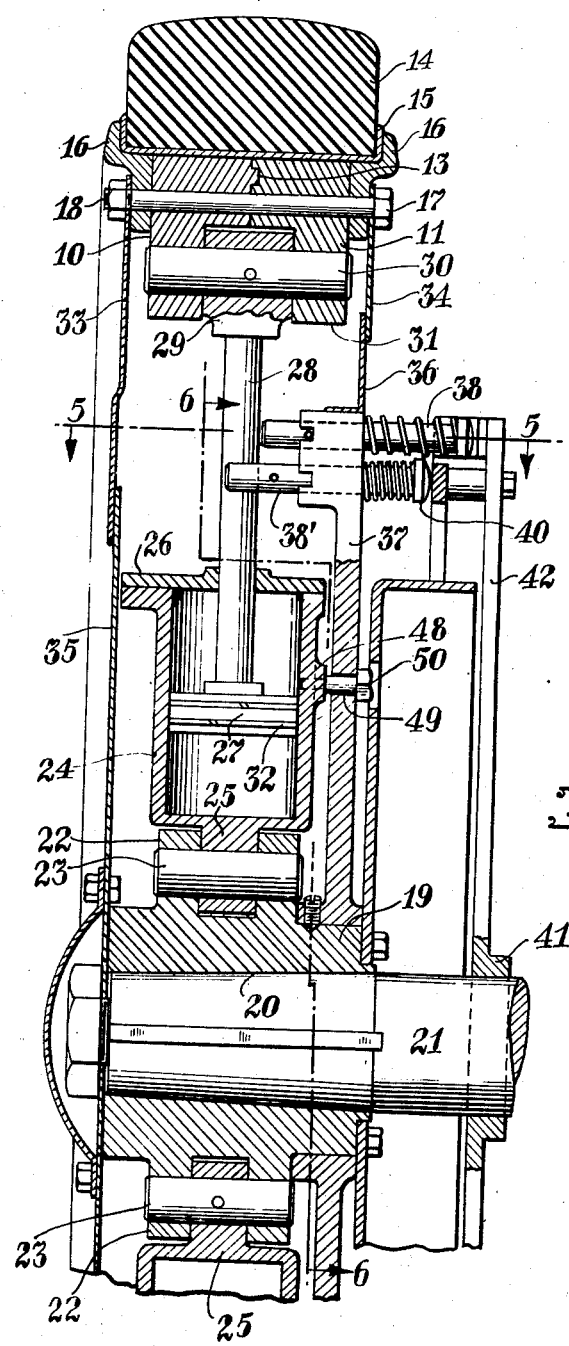
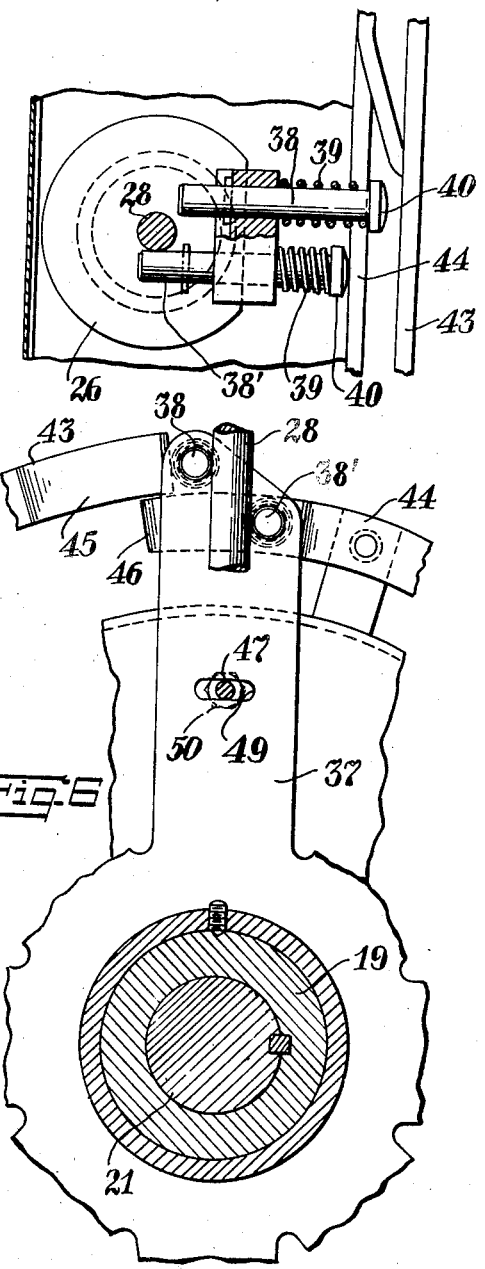
INVENTOR
JOHN T. ACKERSON
JOHN BARTHO
BY
Edw. S. Higgins
ATTORNEY Patented July 23, 1940

2,208,567

UNITED STATES PATENT OFFICE 2,208,567

CUSHIONED WHEEL

John Bartho, New York, N. Y., and John T. Ackerson, Radburnfair Lawn, N. J.

Application July 21, 1938, Serial No. 220,494

5 Claims. (Cl. 152—55)

This invention relates generally to vehicle wheels and more particularly to cushioned wheels.

Heretofore it has been proposed to cushion wheels by providing cylinders and pistons moving therein in the place of the ordinary spokes, the cylinder casings being secured to the felly of the wheel and the piston rods to the hub. Such constructions proved impractical however because the traction or propelling force on the thread portion of the wheel caused the cylinder casing secured to the felly to rotate slower than the piston rod fixed to the hub whereby the cylinder and piston rod became disaligned resulting in a jamming of the piston in the cylinder casing.

It is an object of the present invention to prevent the cylinder casing and piston rod from getting out of alignment regardless of the difference in speed of the felly and hub portions by providing a positive drive to the outside end of the piston rod.

A further object is to provide a wheel with a cushioning device that is positive in action.

Another object is to provide a cushioned wheel that is rugged in construction and economical to manufacture.

Yet another object is to provide a firm connection between the cylinder casing and hub of the wheel.

Still another object is to subject the cylinder casing to a minimum of danger and shocks.

Other objects and advantages of the improved wheel will be apparent from the description thereof to follow taken in connection with the accompanying drawings in which—

Fig. 1 is a side elevation of a wheel embodying the present invention.

Fig. 2 is a detail view of the trackway.

Fig. 3 is an edge view of the trackway and pins.

Fig. 4 is a vertical sectional view of part of the wheel.

Fig. 5 is a plan view of the pins and trackway, on the plane of the line 5—5 of Fig. 4.

Fig. 6 is a sectional view on the plane of the line 6—6 of Fig. 4.

The improved wheel consists of a felly formed of two sections 10 and 11 held in place by a tongue and groove joint 13. A solid rubber tire 14 is supported on a rim 15 on the felly and is held in place by annular rim members 16 which are fastened in place by bolts 17 and nuts 18.

A hub portion 19 has a central opening 20 for fitting onto the spindle of an axle shaft 21 and may be suitably fastened to said shaft. The hub is peripherally channeled so as to provide spaced flanges 22 and secured to the flanges and extending across the space therebetween are bolts or pivot pins 23.

A cylinder 24 is pivotally mounted on each pin 23 by means of an enlargement 25 formed on the bottom of the cylinder casing. The other end of the cylinder is closed by a head 26.

Check valves 24' and 24x are mounted in the wall of the cylinder at the top and bottom respectively for controlling the air passage.

Within each cylinder is a piston having a head portion 27 secured upon one end of a piston rod 28. The other end of the piston rod 28 is formed with an eye portion 29 which is pivotally mounted on a pivot pin 30 supported by flange portions 31 formed on the felly sections 10 and 11. These piston rods 28 form parts of the spokes of the wheel. The piston rods fit slidably through the heads 26 of the cylinders and packing glands may be used to provide an air tight fit between the piston rod and cylinder head.

The piston head is provided with the usual piston rings 32 providing an air tight fit of the piston in the cylinder.

Plates 33 and 34 are suitably fastened to the opposite sides of the rim 15 and extend inwardly into sliding engagement with plates 35 and 36 fastened to the hub 19. These plates house and protect the moving parts of the wheel.

When the piston is moved inwardly toward the enlargement 25 of the cylinder, air will be compressed in this end of the cylinder and air will be drawn into the other end of the cylinder past the valve 24x. On the other hand, when the piston is moving in the opposite direction, air taken into the last mentioned end of the cylinder will be trapped and compressed, and air will be drawn into the first mentioned end of the cylinder past the valve 24'.

It is well known that owing to the traction or propelling force on the tread portion of the wheel, the felly portion thereof will rotate slower than the hub portion. When a cylinder and piston rod are used as parts of a spoke of a wheel this causes trouble as the cylinder or piston rod, whichever is fastened to the felly portion, will travel slower than the other part and cause a disalignment of said parts with a consequent jamming of the piston in the cylinder. In the present invention, applicants overcome this difficulty by providing a positive drive for the outer end of the piston rod thereby keeping the piston rod in alignment with the cylinder and centrally thereof. This means consists of an arm member 37 secured to the hub and extending outwardly toward the felly and adjacent the piston rod. Movably mounted on the outer end of the arm 37 are spaced pins or bolts 38, 38' one on each side of the piston rod 28 and each adapted to be moved into and out of engagement with the piston rod. A spiral spring 39 encircling each bolt between the arm 37 and its head 40 normally urges the pin out of engagement with the piston rod. The bolt 38 is spaced outwardly of the bolt 38'.

Mounted fixedly on the stationary housing 41 of the axle shaft 21 by means of arms 42 are outer and inner tracks 43 and 44, respectively. The outer track 43 is positioned in the path of the outer bolt 38 as it moves around, this track 43 being arcuate in shape and extending about 180 degrees around the wheel. The other track 44 is similarly shaped and is positioned in the path of movement of the inner bolt 38' and also extends 180 degrees around the wheel, both tracks being positioned to complete the entire circle. The tracks 43 and 44 are provided with inclined portions 45 and 46, respectively, at their entrance portions. When the pins or bolts 38 and 38' are off of the tracks 43 and 44, respectively, they are moved away from the piston rods by means of the springs 39.

Upon rotation of the wheel, the arm 37 with the pins 38 and 38' will be carried around by the hub 19. As the pin or bolt 38 projects into alignment with the outer track 43, its head portion 40 will engage the inclined portion 45 of said track and will thereafter ride along said track and be forced outwardly against the piston rod 28. This pin 38 engaging said piston rod carries the drive to the outer end of the piston rod thus providing a more positive drive at this point.

Upon reversing or rotation of the wheel in the opposite direction, the inner pin 38' will engage the inner track 44, initially at its inclined entrance 46, and ride therealong and be forced into engagement with the piston rod 28 thus providing a more positive drive at the outer end of the rod. Any tendency of the rods 28 jamming in the cylinder by reason of any lateral thrust is offset by the sliding fit of the rods in the cylinder head and the fact that the rods are fastened to the parts 10 and 11 of the felly of the wheel. Also the rigid connection between the cylinder and arm 37 prevents any lateral displacement between the cylinder and piston rod. The pin that is in operation always resists the drag of the outer end of the piston rod and thus keeps the piston rod centered in the cylinder.

A pin 47 mounted on a boss 48 on the cylinder casing 24 may be provided to extend through an opening 49 in the arm 37 and a suitable fastening member 50 secures the casing 24 to the arm 37 to prevent the cylinder from moving outwardly toward said arm 37.

With reference to Fig. 1, the pins 38 on the left hand side of the vertical piston rods are in engagement with the track 43 and are pushed by said track into operative position and the pins 38 on the right hand side are off the track 43 and have been moved inwardly away from the piston rods 28 to inoperative position by springs 39.

When the wheel is moving in the direction opposite to the arrows of Fig. 1, the pins 38' will be engaged by the track 44 and moved by said track into operative engagement with the piston rods, and when they move off the track 44 they are moved away from the rods by the springs 39.

By reason of this construction, when the wheel meets with an obstruction and there is a springing action due to the relative movement between the hub and felly of the wheel, the pins 38 and 38' permit the necessary flexibility of the parts as the pins 38 on the right hand side of Fig. 1 having ridden off of the track 43 are in inoperative position away from the rods and the pins 38 on the left hand side especially those associated with the piston rods at an angle to the vertical are underneath the piston rods and cannot jam against the piston rods when the hub moves downwardly. These latter pins 38 on the left hand side however are always in position to bring the drive to the outer ends of the piston rods when the wheel is turning.

We claim:

1. A wheel including a hub, a rim, cylinders secured to the hub, pistons movable in said cylinders and secured to the rim and pins carried by the hub for preventing disalignment of the piston rods and cylinders, thus acting as a positive drive.

2. A wheel including a hub, a rim, cylinders secured to the hub, pistons movable in said cylinders and having their outer ends secured to the rim, arms formed integrally with the hub and pins carried by said arms for preventing disalignment of the piston rods and cylinders, thus acting as a positive drive.

3. A wheel comprising a hub, a rim, cylinders pivotally secured to said hub, pistons in said cylinders and having their rods pivotally secured to the rim, arms formed integrally with the hub and extending radially toward the rim, and a pin carried by each arm on each side of the piston rod and adapted to engage said rod for carrying the drive of the hub to the outer end of the piston rod.

4. A wheel comprising a hub, a rim, cylinders pivotally secured to said hub, pistons in said cylinders having their rods pivotally secured to the rim, arms formed integrally with the hub and extending radially toward the rim and adjacent the piston rods, a movable pin carried by each arm on each side of the piston rod, and means for moving either pin into engagement with the piston rod for carrying the drive of the hub to the outer end of said piston rod.

5. A wheel comprising a hub, a rim, cylinders pivotally secured to said hub, pistons in said cylinders having their rods pivotally secured to the rim, arms formed integrally with the hub and extending radially toward the rim and adjacent the piston rods, a spring pressed pin carried by each arm on each side of the piston rod and normally held out of engagement with the rod and a track-way fixed on the axle housing adapted to be engaged by said pins upon rotation of the hub for moving said pins into engagement with the piston rods.

JOHN BARTHO.
JOHN T. ACKERSON.